H. G. APPLEGARTH AND H. B. TAYLOR.
ELECTRICAL MEASURING INSTRUMENT.
APPLICATION FILED SEPT. 10, 1915.
1,303,146.
Patented May 6, 1919.
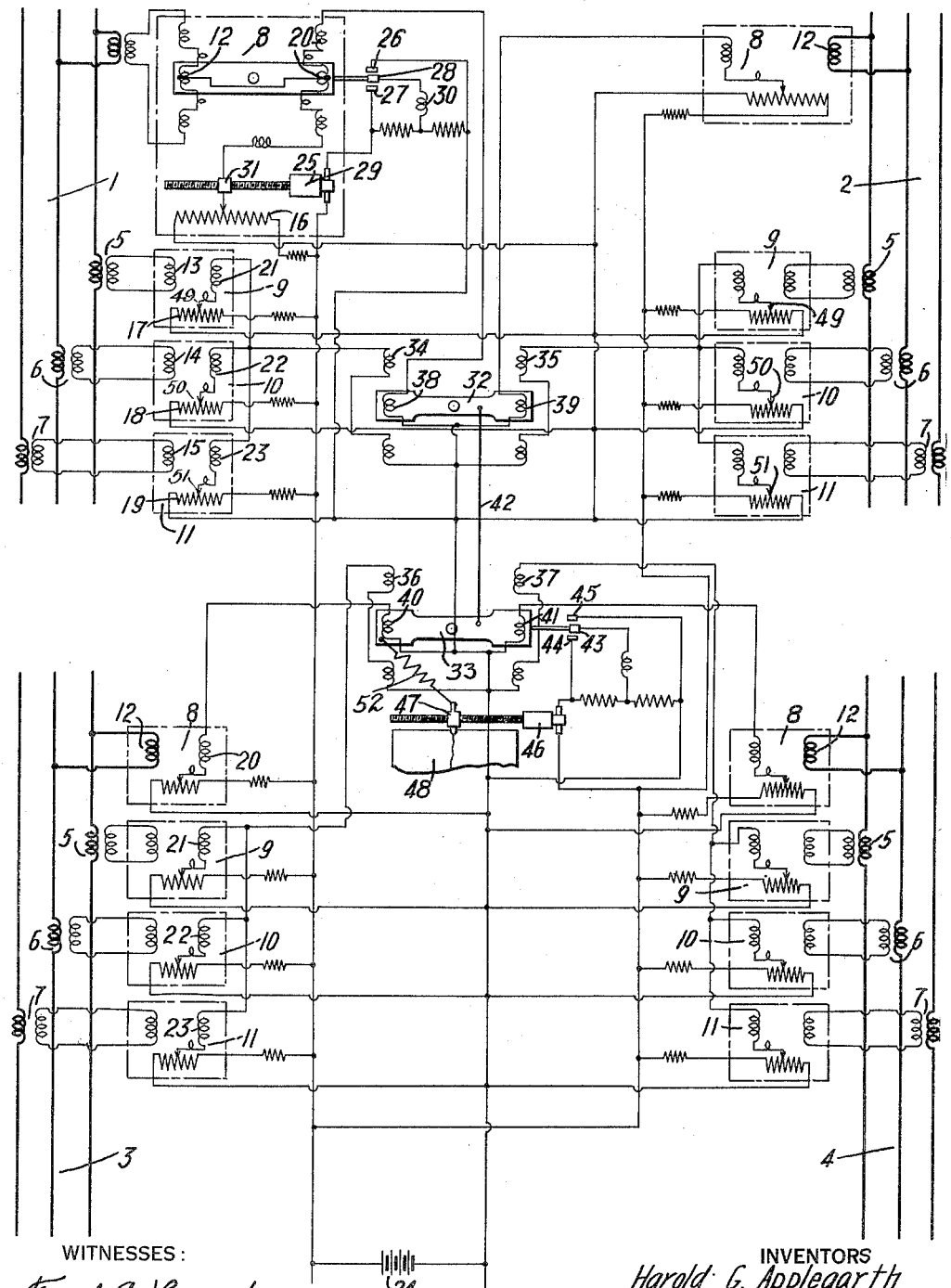
WITNESSES:
Fred A. Lind.
J H Procter
INVENTORS
Harold G. Applegarth
& Harold B. Taylor
BY
Wesley G. Carr
ATTORNEY

UNITED STATES PATENT OFFICE.

HAROLD G. APPLEGARTH AND HAROLD B. TAYLOR, OF WILKINSBURG, PENNSYLVANIA, ASSIGNORS TO WESTINGHOUSE ELECTRIC AND MANUFACTURING COMPANY, A CORPORATION OF PENNSYLVANIA.

ELECTRICAL MEASURING INSTRUMENT.

1,303,146.   Specification of Letters Patent.   Patented May 6, 1919.

Application filed September 10, 1915. Serial No. 50,082.

*To all whom it may concern:*

Be it known that we, HAROLD G. APPLEGARTH, a citizen of the United States, and a resident of Wilkinsburg, in the county of Allegheny and State of Pennsylvania, and HAROLD B. TAYLOR, a citizen of the United States, and a resident of Wilkinsburg, in the county of Allegheny and State of Pennsylvania, have invented a new and useful Improvement in Electrical Measuring Instruments, of which the following is a specification.

Our invention relates to electrical measuring instruments and particularly to volt-ampere meters.

The object of our invention is to provide means for measuring the total volt-amperes traversing one or more electric circuits.

It is frequently necessary to measure power on a volt-ampere basis and also to obtain a graphic record of the total volt-amperes traversing one or more circuits. In order to obtain the above-mentioned measurements, we provide a plurality of instruments similar to Kelvin balances, the windings disposed on corresponding ends of which are so connected to the several electric circuits as to be provided with currents or potentials substantially proportional to the currents or the potentials of the electric circuits. An auxiliary source of direct current is operatively connected to the windings that are disposed on the other corresponding ends of the balances, and the value of the current traversing these windings is varied until the torque developed by the direct-current windings balances that of the alternating-current windings. We provide also a totalizing balance that is supplied with the current from the auxiliary source of direct current to thus indicate or record the direct current required to balance the alternating current which is also an indication of the volt-amperes traversing the main circuits.

The single figure of the accompanying drawings is a diagrammatic view of electrical circuits and instruments illustrating our invention as applied to four three-phase electric circuits for the purpose of obtaining a graphic record of the total volt-ampere load traversing the same.

Four three-phase electric circuits 1, 2, 3 and 4 are each provided with current transformers 5, 6 and 7, and Kelvin balances 8, 9, 10 and 11. Windings 12, that are disposed on corresponding ends of the balances 8, are so operatively connected to the respective circuits 1, 2, 3 and 4 as to be supplied with potentials substantially proportional to the potentials of the respective circuits. The windings 13, 14 and 15, that are disposed on the corresponding ends of the other balances 9, 10 and 11, are operatively connected to the transformers 5, 6 and 7, respectively. The balances 8, 9, 10 and 11 are severally provided with resistors 16, 17, 18 and 19 that are respectively connected to windings 20, 21, 22 and 23 which are mounted on the other ends of the balances 8, 9, 10 and 11, respectively. One terminal of a source of electromotive force 24 is operatively connected to one terminal of each of the resistors 16, 17, 18 and 19.

Each of the balances 8, 9, 10 and 11 is provided with stationary contact members 26 and 27, a movable contact member 28, a motor 25, comprising an armature 29 and a field-magnet winding 30, and a movable contact member 31 that is actuated by the motor 25 in the one or the other direction, depending upon whether the contact member 28 engages the stationary contact member 26 or the contact member 27. Each of the balances will be provided with a controlling device like that illustrated in connection with the balance 8 which is connected to the circuit 1, but, for the sake of simplicity, only one such device is illustrated.

Two main Kelvin balances 32 and 33 are provided with stationary windings 34 and 35 and 36 and 37 and with movable windings 38 and 39 and 40 and 41, respectively. The movable members of the balances 32 and 33 are operatively connected together by a flexible coupling 42. A movable contact member 43 is operatively connected to the movable member of the balance 33 and is adapted to engage either of two stationary contact members 44 and 45 for the purpose of controlling the direction of rotation of the armature of a motor 46 that operates a marking device 47 for recording, on a record sheet 48, the sum of volt-amperes traversing the circuits 1, 2, 3 and 4. The balance 33 may be provided with any suitable form of controlling device 52.

One terminal of the winding 20 of the balance 8 that is connected to the circuit 1 is connected to the movable winding 38 of the balance 32, the other terminal of the winding 38 being connected to one terminal of the battery 24. The other terminal of the winding 20 is so connected to the movable contact member 31 that the same amount of current traverses the winding 20 and the winding 38. Similarly, the winding 20 of the balance 8 that is connected to the circuit 2 is operatively connected to the winding 39, and the winding 20 of the balance 8 that is connected to the circuit 3 and the winding 20 of the balance 8 that is connected to the circuit 4 are operatively connected to the windings 40 and 41, respectively. Thus, the windings on the movable members of the balances 32 and 33 are supplied with current from the source of direct-current electromotive force 24 that is proportional to the potentials of the circuits 1, 2, 3 and 4.

One terminal of each of the windings 21, 22 and 23 of the balances 9, 10 and 11, respectively, is connected to one terminal of the winding 34 of the balance 32, and the other terminal of the winding 34 is connected to one terminal of the battery 24. The other terminals of the windings 21, 22 and 23 of the balances 9, 10 and 11 that are connected to the circuit 1 are operatively connected to the movable contact members 49, 50 and 51, respectively, which are adapted to engage the resistors 17, 18 and 19, respectively. One terminal of each of the windings 21, 22 and 23 of the balances 9, 10 and 11 that are connected to the circuit 2 are connected to one terminal of the winding 35, the other terminal of which is connected to one terminal of the source 24 of electromotive force. The other terminals of the windings 21, 22 and 23 are connected to the movable contact members 49, 50 and 51, respectively, as hereinbefore set forth with respect to the balances that are connected to the circuit 1, and similarly, the windings 21, 22 and 23 of the balances 9, 10 and 11 that are connected to the circuits 3 and 4 are so connected to the windings 36 and 37, respectively, that the current traversing the windings 21, 22 and 23 also traverses the windings 36 and 37, respectively.

Assuming that current traverses the circuit 1, a proportional current will traverse the windings 13, 14, and 15, and current will traverse the winding 12 that is proportional to the voltage of the circuit 1. The balances 8, 9, 10 and 11 will be actuated to cause the contact member 28 to engage one of the stationary contact members 26 and 27 to thus operate the motors 25 and thereby adjust the positions of the contact members 31, 49, 50 and 51 until sufficient current traverses the windings 20, 21, 22 and 23 to cause the balances to return to their mid positions. Since the current required to return the balances to their mid positions also traverses the windings 34 and 38 of the balance 32, and, since the current required to return the balances 8, 9, 10 and 11 that are connected to the circuit 2, to their mid positions, also traverses the windings 35 and 39 of the balance 32, the balance 32 will take a position that is an indication of the sum of the volt-amperes traversing the circuits 1 and 2. Similarly, the balance 33 will move to a position that is a measure of the totalized volt-amperes traversing the circuits 3 and 4. Hence, since the balances 32 and 33 are connected together by the flexible coupling 42, the movable contact member 43 will be moved to a position in accordance with the total volt-amperes of the circuits 1, 2, 3 and 4 to engage one of the contact members 44 and 45, thus completing the circuit of the motor 46 and thereby causing the marking device 47 to record, on the record sheet 48, the values of the total volt-amperes traversing the four circuits.

We do not limit our invention to the particular instruments and devices illustrated, as many modifications may be made therein without departing from the spirit and scope of the invention as set forth in the appended claims.

We claim as our invention:

1. A volt-ampere meter for a plurality of electric circuits comprising a plurality of Kelvin balances having windings disposed on corresponding ends thereof that are adapted to be traversed by currents proportional to the voltages and the currents of the various circuits, respectively, a source of electromotive force operatively connected to the windings disposed on the other ends thereof, means controlled by the balances for regulating the current traversing the last-mentioned windings, and a main wattmeter supplied with current proportional to the current traversing the said last-mentioned windings.

2. A totalizing volt-ampere meter for a plurality of electric circuits comprising a plurality of Kelvin balances having main windings on corresponding ends thereof that are so connected to the circuits as to be supplied with potentials and currents in proportion to be potentials and currents of the circuits, auxiliary windings on the other ends thereof, a source of electromotive force operatively connected to the auxiliary windings, means controlled by the balances for regulating the currents traversing the auxiliary windings, and a main Kelvin balance the windings of which are connected in circuit with the auxiliary windings.

3. A measuring instrument for an electric circuit comprising a plurality of Kelvin balances having main windings on corresponding ends thereof and auxiliary windings on the other ends thereof, said main windings being operatively connected in shunt and in series relation, respectively, to the electric circuit, a source of electromotive force operatively connected to the auxiliary windings, an electro-responsive device operatively connected in circuit with the auxiliary windings, and means for varying the current traversing the auxiliary winding until the balances are in their mid° positions.

4. A measuring instrument for an electric circuit comprising a plurality of Kelvin balances having main windings on corresponding ends thereof and auxiliary windings on the other ends thereof, said main windings being operatively connected in shunt and in series relation, respectively, to the electric circuit, a source of electromotive force operatively connected to the auxiliary windings, an electro-responsive device operatively connected in circuit with the auxiliary windings, and auxiliary means controlled by the balances for varying the current traversing the auxiliary windings until the balances are in their mid positions.

5. A totalizing volt-ampere meter for a plurality of electric circuits comprising a plurality of Kelvin balances having main and auxiliary windings thereon, the said main windings being so connected as to be supplied with currents and potentials proportional to the currents and potentials of the electric circuits, an auxiliary source of electromotive force operatively connected to the auxiliary windings, a variable resistor connected in circuit with each auxiliary winding, means for varying the resistance of the said resistor until the balances are in their mid positions, and means for indicating the power that corresponds to the currents traversing the auxiliary windings.

6. A totalizing volt-ampere meter for a plurality of electric circuits comprising a plurality of Kelvin balances having main and auxiliary windings thereon, the said main windings being so connected as to be supplied with currents and potentials proportional to the currents and potentials of the electric circuits, an auxiliary source of electromotive force operatively connected to the auxiliary windings, a variable resistor connected in circuit with each auxiliary winding, means for varying the resistance of the said resistors until the balances are returned to their mid positions, and means for indicating the summation of the power traversing all the auxiliary windings.

7. A volt-ampere meter for an electric circuit comprising a Kelvin balance the windings on corresponding ends of which are connected in series relation to the circuit, a second Kelvin balance the windings on corresponding ends of which are supplied with current proportional to the potential of the circuit, a source of direct-current force operatively connected to the other windings on the Kelvin balance, a third Kelvin balance operatively connected to the last-mentioned windings, and means controlled by the two first-mentioned balances whereby the current that is supplied to the third balance by the auxiliary source of direct-current electromotive force is so varied that the balances are maintained in their mid positions to thereby cause the said third balance to indicate the volt-amperes traversing the circuit.

8. A measuring instrument for an electric circuit comprising a plurality of Kelvin balances having windings disposed on the corresponding ends thereof that are adapted to be traversed by currents proportional to the voltage and current of the circuit, respectively, a source of electromotive force operatively connected to the windings disposed on the other ends of the balances, means controlled by the balances for regulating the current traversing the last-mentioned windings, and means for determining the current traversing the last-mentioned windings.

9. A measuring instrument for an electric circuit comprising a plurality of Kelvin balances having windings disposed on the corresponding ends thereof that are adapted to be traversed by currents proportional to the voltage and current of the circuit, respectively, a source of electromotive force operatively connected to the windings disposed on the other ends of the balances, means controlled by the balances for regulating the current traversing the last-mentioned windings, and means actuated by the current traversing the last-mentioned windings.

10. A measuring instrument for an electric circuit comprising a plurality of Kelvin balances having windings disposed on the corresponding ends thereof that are adapted to be traversed by currents proportional to the voltage and current of the circuit, respectively, a source of electromotive force operatively connected to the windings disposed on the other ends of the balances, means controlled by the balances for regulating the current traversing the last-mentioned windings, and a wattmeter supplied with current in accordance with the current traversing the last-mentioned windings.

11. A measuring instrument for an electric circuit comprising two Kelvin balances, the windings on the corresponding ends thereof being so connected to the circuit that they are supplied with current in accordance with the potential of, and the current traversing, the circuit, respectively, means for supplying such currents to the windings on the other ends of the balances that they are maintained in their balanced position, and means for determining the product of the last-mentioned currents.

12. The method of determining the volt-amperes traversing an alternating-current circuit which consists in determining the product of two direct currents that are proportional to the potential of, and the current traversing, the alternating-current circuit, to be measured.

13. The method of determining the volt-amperes traversing an alternating-current circuit which consists in supplying a wattmeter with direct currents proportional to the potential of, and the current traversing, the alternating-current circuit to be measured.

14. A volt-ampere meter for an alternating-current circuit comprising two windings, means for supplying direct current to one winding in accordance with the current traversing the circuit and means for supplying the other winding with direct current in accordance with the potential of the circuit.

In testimony whereof we have hereunto subscribed our names this 25th day of Aug., 1915.

HAROLD G. APPLEGARTH.
HAROLD B. TAYLOR.